United States Patent [19]

Seung et al.

[11] Patent Number: 4,662,861

[45] Date of Patent: May 5, 1987

[54] TWO SPEED ACCESSORY DRIVE

[75] Inventors: Michael B. Seung, St. Hubert; Ramalingam Sivalingham, Mississauga; David A. Bullen, Ottawa; Andrew G. Anderson, London; Donald A. McCharles, Blenheim, all of Canada

[73] Assignee: Canadian Fram Limited, Chatham, Canada

[21] Appl. No.: 802,654

[22] Filed: Nov. 27, 1985

[51] Int. Cl.[4] .................. F16H 7/00

[52] U.S. Cl. .................. 474/86; 474/87; 192/48.92

[58] Field of Search .................. 474/69, 72, 73, 74, 474/86, 87, 148; 192/48.6, 48.92

[56] References Cited

U.S. PATENT DOCUMENTS

| | | | |
|---|---|---|---|
| 2,955,478 | 10/1960 | Davis | 474/74 X |
| 2,964,959 | 12/1960 | Beck et al. | 474/74 X |
| 4,304,150 | 12/1981 | Lupo et al. | 474/73 X |
| 4,459,123 | 7/1984 | Tatsunaka et al. | 474/87 |

FOREIGN PATENT DOCUMENTS

| | | | |
|---|---|---|---|
| 1237643 | 6/1971 | United Kingdom | 474/74 |

*Primary Examiner*—James A. Leppink
*Assistant Examiner*—Frank H. McKenzie, Jr.
*Attorney, Agent, or Firm*—Markell Seitzman; Russel C. Wells

[57] ABSTRACT

A two speed accessory drive (10) comprising an input unit (20) and a remotely positioned output unit (100) connected by a plurality of belts (108,100). The input unit is adapted to be driven by a remotely positioned driving member (102). The output unit, which is connected to the engine accessories by a serpentine belt (106), includes a linear actuator (280) for engaging and disengaging same.

15 Claims, 2 Drawing Figures

TWO SPEED ACCESSORY DRIVE

BACKGROUND AND SUMMARY OF THE INVENTION

The invention relates to a two speed accessory drive mechanism which is capable of rotating a plurality of devices at one of two predetermined speeds. More particularly the invention relates to a two speed accessory drive comprising an input unit driven by a driving member such as an engine crankshaft and further includes an output unit separated from the input unit. Both the input and output units are positioned remotely from the driving member for driving the accessories.

Engines utilize a plurality of accessories such as a power steering pump, water pump, air pump and air conditioner. It is well known that such accessories generate a parasitic drag upon the engine thus reducing its overall efficiency. It is well known that by providing a device such as a two speed accessory drive to drive these accessories the parasitic loss is reduced, fuel ecomony and acceleration performance increased and the longevity of the accessories increased. Typically, the two speed accessory drive is substituted for the engine crankshaft pulley. Such prior drives have utilized planetary gear sets whereby either the sun gear, ring gear or planetary carrier is periodically fixed from rotating thereby causing the planetary gear set to rotate an output member at one of two predetermined speeds. Such planetary gear accessory drives exhibit an audible whine and are relatively long and bulky in order to accommodate the internal gearing mechanisms. With the advent of transversely mounted engines there is not sufficient room in the engine compartment to accommodate these prior direct mounted engine driven drives.

It is an object of the present invention to provide a quietly operating, efficient two speed accessory drive mechanism. A further object of the present invention is to provide such a mechanism which is capable of being remotely positioned from the engine crankshaft pulley such that the drive may be utilized with transversely mounted engines. Accordingly, the invention comprises: A two-speed accessory drive having a high speed or engaged and a low speed or disengaged mode of operation comprising: a driving member, an input unit remotely positioned relative to the driving member, a first belt linking the driving member to the input unit for driving or rotating same, and an output unit remotely positioned relative to the driving member and the input unit. The input unit comprises a input pulley driven by the first belt and a first pulley driven by the input pulley. The output unit comprises a second pulley driven by the first pulley. The diameters of the first and second pulleys are chosen to drive the second pulley at a speed greater than the speed of the input pulley. A third pulley is remotely positioned from the driven by the second pulley. The drive further includes a friction clutch rotationally moved by the second pulley and means for engaging and disengaging the friction clutch to and from the third pulley. The input unit further includes a fourth pulley and overrunning clutch means supporting the fourth pulley relative to the input pulley for driving the fourth pulley at the speed of the input pulley and for permitting the fourth pulley to overrun the speed of the input pulley during instances when the friction clutch is in engagement with the third pulley. The fourth pulley is drivingly connected to the third pulley. The diameters of the third and fourth pulleys are related such that when the friction clutch is disengaged from the third pulley, the third pulley is driven at a speed lower than the speed of the second pulley and when the friction clutch is engaged to the third pulley, the third pulley is driven at the higher speed of the second pulley.

Many other objects, features, purposes and advantages of the invention will be clearer from the detailed description of the drawings.

DETAILED DESCRIPTION OF THE DRAWINGS

Figure 1:
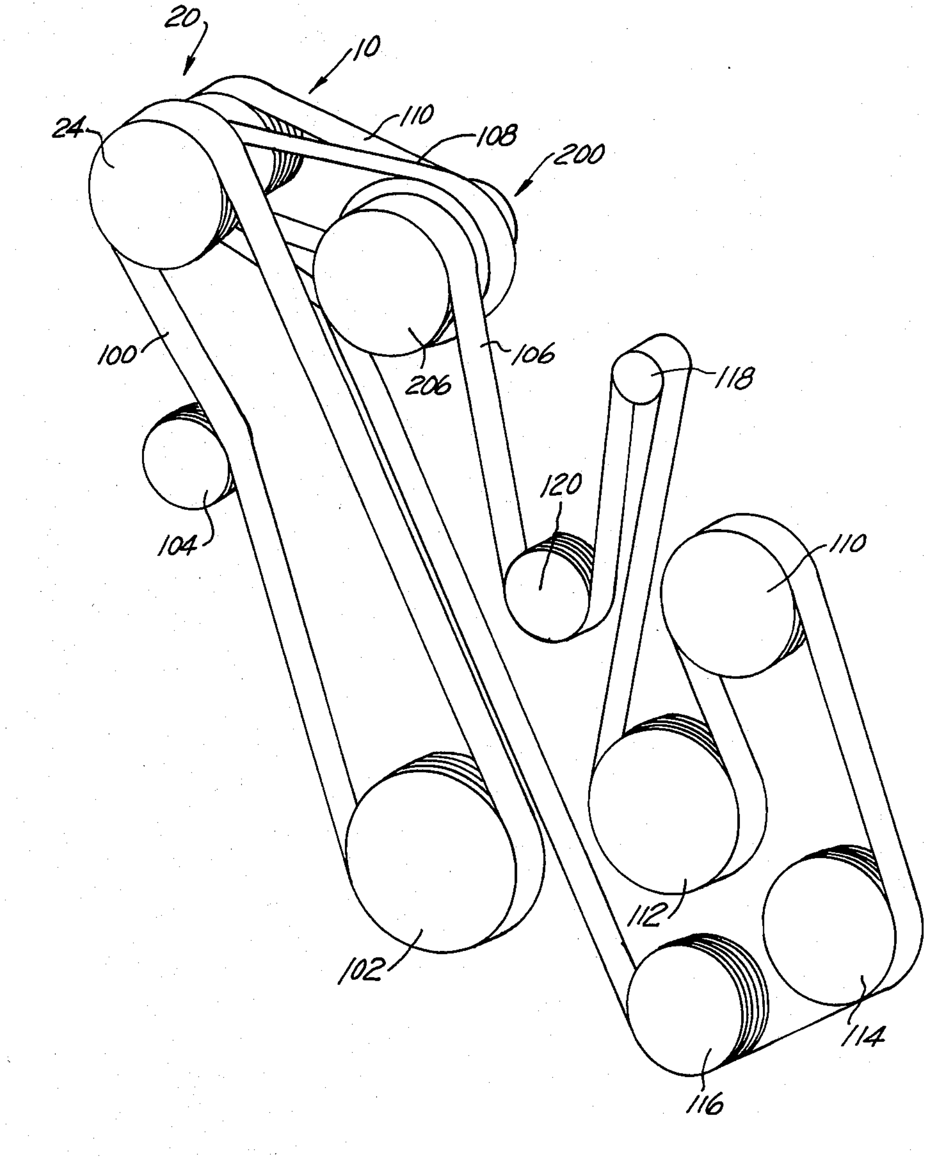
FIG. 1 diagramatically illustrates a typical installation of the present invention in relation to a plurality of accessories.

Reference is briefly made to FIG. 1 which illustrates a two speed accessory drive generally designated as 10. The two speed accessory drive 10 comprises an input unit 20 and an output unit 200. The input unit 20 is driven by a first belt 100 from the engine crankshaft pulley 102. An idler gear or pulley 104 is positioned relative to the belt 100 to maintain adequate tension thereon. An output pulley 206 of the output unit 200 is drivingly connected via belt 106 to a plurality of automotive accessories such as a power steering pump 110, a water pump 112, an air pump 114, an air conditioning unit 116 and alternator 118. Another idler pulley such as pulley 120 is positioned between the output pulley 206 and the accessories to provide proper tensioning of the belt 106. While the engine itself is not illustrated in FIG. 1 it can be seen that the drive 10 is mounted remotely from the engine crankshaft 102 and in particular it is preferable but not essential to locate the input unit 20 and the output unit 200 of the drive 10 proximate the top of the engine. Such placement permits the accommodation of the drive 10 for a transverse mounted vehicle application. While the preferred embodiment of the invention is illustrated in conjunction with such a transversely mounted engine the invention is not so limited.

Figure 2:
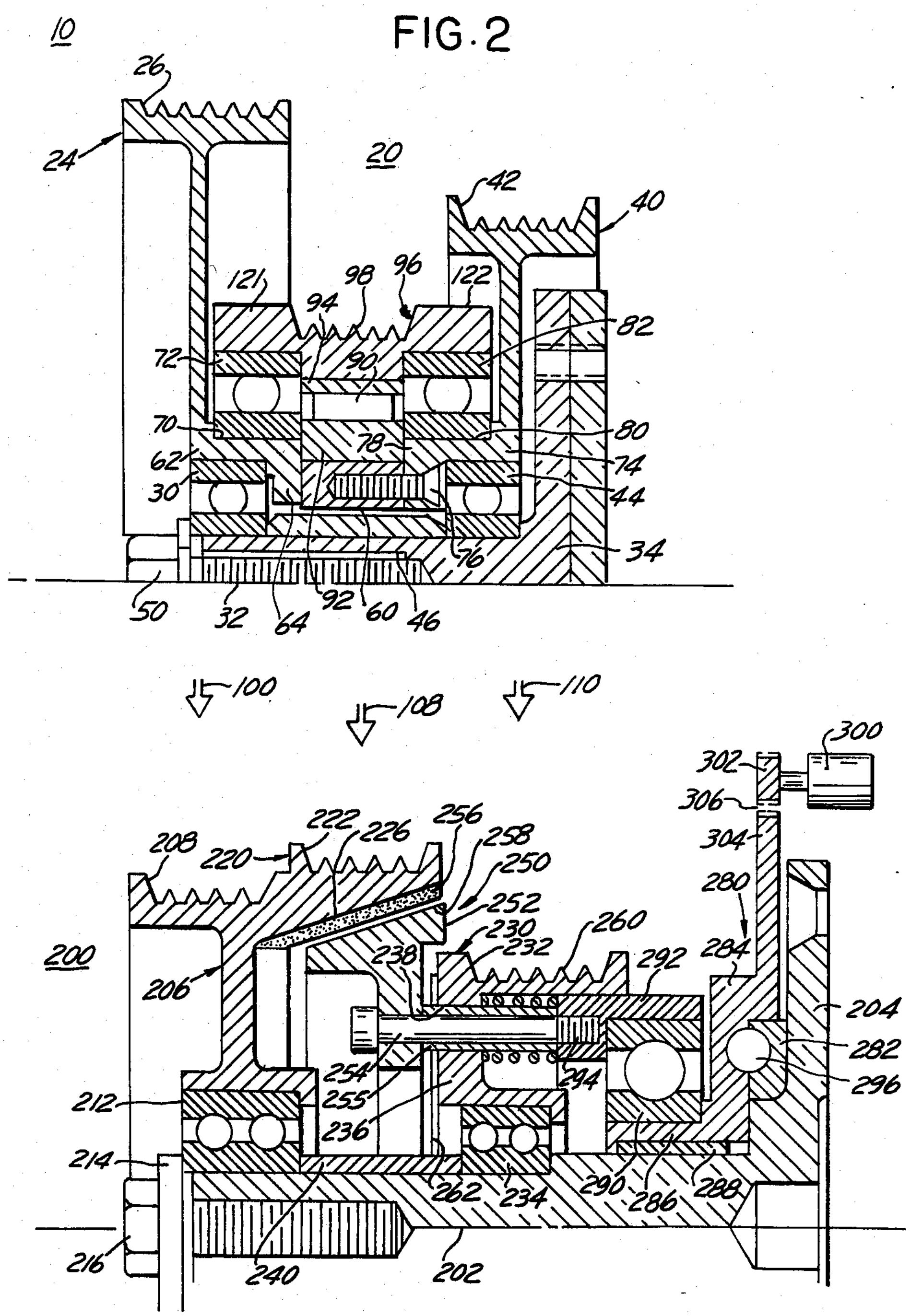
FIG. 2 illustrates the preferred embodiment of the present invention showing a remotely positioned input unit and output unit.

Reference is now made to FIG. 2 which illustrates the two speed accessory drive generally designated as 10. As mentioned above, the drive 10 comprises an input unit 20 remotely situated from a driving or input member 102 (shown in FIG. 1) such as the engine crankshaft pulley. The input unit 20 includes an input pulley 24 having a pulley face 26 which receives the belt 100 shown as arrow 100. The input pulley 24 is supported on a bearing 30 relative to a shaft 32. The input pulley 24, bearing 30, etc... may be secured to the shaft 32 by a washer 48 and bolt 50. The shaft 32 may be formed as an integral extension of a bracket 34 which serves to mount the input unit 20 remote from the driving member 102. The input unit 20 further includes a high speed drive pulley 40 which includes a pulley face 42 which receives belt 110 shown as arrow 110. The pulley 40 is supported on bearing 44 relative to the shaft 32 and is drivingly connected to the input pulley 24. A cylindrical spacer 46 is positioned about the input shaft 32 for spacing the bearings 30 and 44 thereapart. The spacer 46 keeps the bearings 30 and 34 in position and absorbs the radial load. An inner ring 60 is rotatably positioned about the spacer. The inner ring 60 is not connected to the spacer 46 but to the pulleys 24 and 40 and rotates with them. The ends of the inner ring 60 are fixedly attached to both the input pulley 24 and to the high speed drive pulley 40 via screws 76 or other fastening means. The screw connection of the inner ring 60 to the input pulley 24 is not shown in FIG. 2.

The input pulley 24 includes an axial extension 62 supported by bearing 30 and a radial extension 64 in engagement with one end of the inner ring 60. The axial extension 62 further defines a shoulder 70 for supporting another bearing 72. The high speed drive pulley 40 similarily includes an axial extension 74 supported by bearing 44 and a radial extension 78 in butting engagement with the other end of the inner ring 60. The axial extension 74 of the pulley 40 defines another shoulder 80 positioned opposite from the shoulder 70 for supporting yet another bearing 82.

A one-way or overrunning clutch 90 is positioned in the space between the bearing 72 and the bearing 82 and includes an inner race 92 supported and rotated by the inner ring 60. The clutch 90 further includes an outer race 94. Such one-way or overrunning clutches 90 are well known in the art. The outer race 94 is rotatingly connected to a low speed drive pulley 96 which includes a pulley face 98 for receiving the belt 108, shown as arrow 108. The pulley 96 further includes a plurality of radial extensions 121 and 122 respectively positioned on either side of the face 98 and rotatingly supported by the bearings 72 and 82. From the above, it can be seen that the pulleys 24 and 40, the axial extensions 62 and 74, the radial extensions 64 and 78, and the inner ring 60 rotate as a solid component since the inner race 92 is firmly attached to the inner ring 60.

FIG. 2 further illustrates the output unit 200 that is remotely positioned from the driving member 102 and from the input unit 20. The output unit comprises a shaft 202 supported by a bracket 204 and an output or drive pulley 206 which includes a first face 208. The output unit further includes a low speed output pulley 220 having a pulley face 222. As illustrated in FIG. 2 the low speed output pulley 220 and the drive or output pulley 206 are of integral construction. The output or drive pulley 206 is connected via belt 106 to the accessories while the low speed output pulley 220 is connected to pulley 96 of the input unit by the belt 108 (see FIG. 1). The output or drive pulley 206 is rotationally supported on the shaft 202 by a bearing 212. The pulley 206, bearing 212 and other components of the output unit 200 are axially secured to the shaft 202 by washer 214 and bolt 216. The output unit 200 further includes a high speed output pulley 230 which includes a pulley face 232. The pulley 230 is supported relative to the shaft by a bearing 234. The pulley 230 further includes a radially extending portion 236 which includes a plurality of openings 238 therethrough. A cylindrical spacer 240 supported by the shaft 202 is utilized to space the bearings 212 and 234 and the output pulley 206 and pulley 230 thereapart.

The output unit includes a friction clutch 250. In the preferred embodiment of the invention the friction clutch comprises a cone clutch which is rotated by the high speed output pulley 230. More specifically the friction clutch 250 includes a pressure plate 252 supported by and also driven by the high speed output pulley 230 by a plurality of pins 254 which extend through a like plurality of push tubes 255 which extend through the openings 238 in the pulley 230. The friction clutch 250 further includes a conically shaped surface or female cone 226 formed as part of the low speed output pulley 220. This surface 226 supports a ring of friction material 256. The pressure plate 252 further includes a conically shaped engagement surface or male cone 258 which engages the friction material 256 as the pressure plate is moved axially to the left as viewed in FIG. 2.

The high speed output pulley 230 is drivingly connected to and is driven by the high speed drive pulley 40 by means of a belt 110.

The output unit 200 further includes a linear actuator generally designated as 280 for axially moving the friction clutch 250 into and output of engagement with the output or drive pulley 206 or low speed output pulley 220. In the preferred embodiment of the invention the linear actuator comprises a ball ramp actuator. Such actuator 280 comprises a first ramp member 282 fixedly supported relative to the shaft 202 and a second ramp member 284 rotatably situated relative to the first ramp member 282 and slidably positionable relative to the shaft 202. More specifically, the second ramp member 284 comprises an axial extension 286 which is supported relative to the input shaft 202 by a bushing 288. The first and second ramp members are separated by a plurality of balls 296. While not shown in FIG. 2 the ramp members 282 and 284 comprise a ramp or inclined inner surface which as the second ramp member 284 is rotated relative to the first ramp member 282 causes the second ramp member 284 to be axially displaced relative to the first ramp member 282. It should be noted that the present invention is not limited to the use of ball ramp actuators, other linear actuator means may be substituted therefore such as a sliding ramp actuator or other similar device. A thrust or angular contact bearing 290 is supported by the axial extension 286. The thrust bearing 290 supports a pin retainer 292 received thereabout which includes means for receiving the various pins 254. Such means may comprise a plurality of threaded holes 924 into which the ends of each of the respective pins 254 are received. Further, the push tubes 255 butt up against the retainer 294. The output unit 200 further includes a plurality of springs 260 received about each of the pins 254 and push tubes 255 for biasing the high speed output pulley 230 and the pin retainer 294 thereapart. Springs 262 such as leaf springs can be optionally fitted between the pressure plate 254 and pulley 230 and secured thereto by bolts or rivets so that the springs transmit torque through the pressure plate 252 to the pulley 230. Further, the linear actuator 280 comprises means for rotating the second ramp member 284 relative to the first ramp member 282 such rotational displacement causing the axial displacement of the second ramp member. Such means preferably include a motor 300 connected to a gear 302 which drives a radial extension 304 of the member 284 through sets of gear teeth 306. While in the preferred embodiment of the invention the motor 300 is an electric motor, pneumatic or hydraulic means may be substituted for the electric motor.

The operation of the present invention is described below. The drive 10 has two modes of operation, a high speed or normal mode of operation characterized by the friction clutch 250 drivingly engaging the high speed output pulley 230 to the output pulley 206 and a low speed mode of operation wherein the friction clutch 250 is disengaged from the output pulley wherein the output pulley is driven by the low speed drive pulley 96. During both modes of operation the input pulley 24 is driven by the crankshaft pulley 102 by the belt 100. By virtue of the direction connection of the high speed drive pulley 40 to the input pulley 24 the high speed drive pulley is similarily rotated at the speed of the input pulley 24. The rotation of the pulley 40 is imparted to the high speed output pulley 230 by belt 110. The diameters of the pulleys 40 and 230 are chosen such that the speed of the high speed output pulley 230 is greater than the speed of the drive pulley 40. During the low speed mode of operation the linear actuator is moved rightwardly as viewed in FIG. 2 thereby disengaging the pressure plate 252 from the friction material 256. During this mode of operation as well as during the high speed mode of operation the pressure plate 252 will rotate with the high speed output pulley 230 by virtue of the connection through the pins 254 and push tubes 255. The leaf springs will assist with the operation if so included. In addition, during this low speed mode of operation the low speed drive pulley 96 is driven by the input pulley 24 through the one way or overrunning clutch 90. The rotation of the pulley 96 is imparted to the pulley 220 via belt 108 which in turn rotates the output pulley 206. The diameters of the pulleys 96 and 220 are chosen such that there is a speed reduction which causes the output pulley 206 to rotate at the lower predetermined speed.

When it is desired to rotate the accessories at their normal or increased speed the linear actutor 280 is activated thereby moving the second ramp member 284, thrust or angular contact bearing 290, the pin retainer 294, pins 254, push tubes 255, springs 262 and pressure plate 252 to the left as viewed in FIG. 2. This displacement drivingly engages the high speed output pulley 230 to the output pulley 206. Upon engagement of the pressure plate 252 to the friction material 256 the output pulley 206 will rotate at the normal or faster speed. This increased speed is imparted to the low speed output pulley 220 which in turn will over drive the smaller pulley 96 relative to the speed of the input pulley 24. By virtue of the operation of the overrunning clutch 90 the belt 108 will free wheel with the pulleys 96 and 220 such as not to transmit rotational torque to the output pulley 206. It should be noted that the push tubes 255 transmit both the driving torque and the engagement or thrust load to the pressure plate 252. The optional springs 262 also transmit the driving torque.

While the preferred embodiment illustrates a drive 10 having a remotely situated input and output units 40 and 200, respectively which are connected therebetween by a pluraltiy of drive belts 108 and 110 the invention is not so limited. While the remote connection between the input unit and the output unit is desirable for it permits the relocation of such units into more spacious areas within the engine compartment the pulleys 40,230,96 and 220 and their associated belts 108 and 110 may be replaced by direct gear enagagement.

Many changes and modifications in the above described embodiment of the invention can, of course, be carried out without departing from the scope thereof. Accordingly, that scope is intended to be limited only by the scope of the appended claims.

What is claimed is:

1. A two-speed accessory drive having a high speed or engaged and a low speed or disengaged mode of operation comprising:

a driving member, an input unit remotely positioned relative to said driving member, a first belt linking said driving member to said input unit for driving or rotating same, an output unit remotely positioned relative to said driving member and said input unit, said input unit comprises a input pulley driven by said first belt and a first pulley driven by said input pulley, said output unit comprises:

a second pulley driven by said first pulley, the diameters of said first and second pulleys related to drive said second pulley at a first speed greater than the speed of said input pulley;

a third pulley remotely positioned and driven by said second pulley;

a friction clutch rotationally moved by said second pulley;

means for engaging and disengaging said friction clutch to and from said third pulley;

said input unit further includes a fourth pulley, overrunning clutch means supporting said fourth pulley relative to said input pulley for driving said fourth pulley at the speed of said input pulley and for permitting said fourth pulley to overrun the speed of said input pulley during instances when said friction clutch is in engagement with said third pulley, said fourth pulley drivingly connected to said third pulley, the diameters of said third and fourth pulleys related such that when said friction clutch is disengaged from said third pulley said third pulley is driven at a speed lower than the speed of said second pulley and when said friction clutch is engaged to said third pulley, said third pulley is driven at the higher speed of said second pulley.

2. The drive as defined in claim 1 wherein when said friction clutch is in engagement with said third pulley, said fourth pulley is driven at a speed which is greater than that of the input pulley to effectively disengage same from said input pulley.

3. A two-speed accessory drive comprising:

an input unit remotely situated from a driving member including an input pulley (24) having a pulley face connected to said driving member by a first belt, said input pulley supported on first bearings relative to a shaft, said shaft formed as an integral extension of a bracket which serves to mount said input unit remote from said driving member, a high speed drive pulley, including a pulley face, supported on second bearings relative to said input shaft, a cylindrical sleeve or spacer positioned about said input shaft for spacing said first and said second bearings thereapart, an inner ring supporting an inner race rotatably positioned thereabout, said inner ring fixedly attached to said input pulley and said high speed drive pulley, said input pulley including a first axial extension, supported by said first bearing and a radial extension in butting engagement with one end of said inner ring, said first axial extension further defining a first shoulder for supporting a third bearing, said high speed drive pulley including a second axial extension supported by said second bearing and a radial extension in butting engagement with the other end of said inner ring, said second axial extension further defining a second shoulder apart from said first shoulder for supporting a fourth bearing apart from said third bearing, a one-way clutch positioned in the space between said third bearing and said fourth bearing and including said inner race supported and rotated by said inner ring and an outer race, said outer race rotatingly connected to a low speed drive pulley having a pulley face and a plurality of radial extensions positioned upon and rotatingly supported by said third bearing and said fourth bearing, respectively;

an output unit remotely situated from said driving member and said input unit comprising:

a shaft supported by a bracket, an output pulley including a first and a second pulley face, said first pulley face connectable to various devices, said second pulley face connected to said low speed drive pulley by a second belt, said output pulley rotatingly supported on said shaft by a fifth bearing;

a high speed output pulley including a pulley face supported relative to said shaft by a sixth bearing, comprising an axially extending portion including a plurality of push rods extending through openings therein, a cylindrical spacer supported by said shaft for spacing said fifth and said sixth bearings apart, a friction clutch rotated by said high speed output pulley and axially movable relative thereto by said pushrods;

linear actuator means for axially moving said friction clutch into and out of engagement with said output pulley.

4. The drive as defined in claim 3 wherein said friction clutch comprises a pressure plate movable relative to said output pulley and a plurality of pins extending through said push rods of said high speed output pulley and attached to and movable with said linear actuator means.

5. The drive as defined in claim 4 wherein said friction clutch further includes friction material carried by said output pulley for engagement with said pressure plate.

6. The drive as defined in claim 5 wherein said friction clutch is a cone clutch.

7. The drive as defined in claim 6 wherein said friction material is supported by a conically shaped surface of said output pulley and wherein said friction plate includes a conically shaped engagement surface for engagement with said friction material.

8. The drive as defined in claim 5 further including a biasing means including a plurality of springs received about that part of each said push rod extending through said openings of said pressure plate for biasing said friction clutch and said linear actuator means thereapart.

9. The drive as defined in claim 8 wherein said linear actuator means comprises a first member fixedly positioned relative to said shaft, a second member axially displacable relative to said first member and said shaft, said second member connected rotatably to said pin retainer and push rods for axially displacing same and means for displacing said second member.

10. The drive as defined in claim 9 wherein said second member includes an axial extension slidably supported on said shaft by a bushing, a thrust bearing supported by said axial extension and a pin retainer received about said thrust bearing including means for receiving said pins.

11. The drive as defined in claim 10 wherein said springs are positioned between said high speed output pulley and said pin retainer.

12. The drive as defined in claim 8 wherein said displacing means comprises means are drivingly connected to second member for rotating same relative to said first member for causing said second member to be displaced axially relative to said first member.

13. The drive as defined in claim 12 wherein said rotating means includes a motor, a gear driven by said motor, said gear drivingly engaging a radial extension of said second member.

14. The drive as defined in claim 13 wherein said linear actuator means is a ball ramp actuator.

15. The drive as defined in claim 1 further including spring means for driving connecting and for biasing apart said pressure plate and said high speed output pulley.

* * * * *